United States Patent
Karale et al.

(10) Patent No.: US 11,713,669 B2
(45) Date of Patent: Aug. 1, 2023

(54) REAL-TIME DIVERTER DIAGNOSTICS AND DISTRIBUTION

(71) Applicant: Halliburton Energy Services, Inc., Houston, TX (US)

(72) Inventors: Chaitanya Mallikarjun Karale, Spring, TX (US); Vladimir Martysevich, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 245 days.

(21) Appl. No.: 17/277,037

(22) PCT Filed: Dec. 31, 2018

(86) PCT No.: PCT/US2018/068186
§ 371 (c)(1),
(2) Date: Mar. 17, 2021

(87) PCT Pub. No.: WO2020/142082
PCT Pub. Date: Jul. 9, 2020

(65) Prior Publication Data
US 2022/0034219 A1  Feb. 3, 2022

(51) Int. Cl.
*E21B 47/06* (2012.01)
*E21B 43/26* (2006.01)
*E21B 43/267* (2006.01)

(52) U.S. Cl.
CPC ............ *E21B 47/06* (2013.01); *E21B 43/26* (2013.01); *E21B 43/267* (2013.01)

(58) Field of Classification Search
CPC ........ E21B 47/06; E21B 43/23; E21B 43/267; E21B 43/25; G06N 20/00
See application file for complete search history.

(56) References Cited

U.S. PATENT DOCUMENTS 9,085,975 B2  7/2015  Abad
9,135,475 B2  9/2015  Lecerf et al.
(Continued)

FOREIGN PATENT DOCUMENTS

WO  2014105451  7/2014
WO  2017003501  1/2017
(Continued)

OTHER PUBLICATIONS

International Application No. PCT/US2018/068186, International Search Report and Written Opinion, dated Oct. 1, 2019, 11 pages.
(Continued)

*Primary Examiner* — Brad Harcourt
(74) *Attorney, Agent, or Firm* — Kilpatrick Townsend & Stockton LLP

(57) ABSTRACT

Certain aspects and features relate to a system that determines a result or outcome of a diverter drop in terms of whether far field or near-wellbore bridging, plugging, or diversion has been achieved. The system can provide for real-time measurements and real-time decision making in terms of an optimized diverter to be used in a wellbore. A system for diverter diagnostics can includes a pressure sensor and a processing device communicatively coupled to the pressure sensor. A non-transitory memory device includes instructions that are executable by the processing device to measure an onset of diversion pressure response (DPR) waveform and output or store indications of a result or results of a diverter drop. These results can then be used to adjust a particle size distribution for the diverter.

20 Claims, 12 Drawing Sheets

(56) References Cited

U.S. PATENT DOCUMENTS

| | | | |
|---|---|---|---|
| 2014/0076544 A1* | 3/2014 | Lecerf | E21B 33/138 175/50 |
| 2015/0075778 A1 | 3/2015 | Walters et al. | |
| 2017/0370208 A1 | 12/2017 | Dawson | |
| 2018/0238147 A1 | 8/2018 | Shahri et al. | |
| 2019/0345803 A1* | 11/2019 | Madasu | E21B 43/26 |
| 2021/0131253 A1* | 5/2021 | Martysevich | E21B 43/267 |

FOREIGN PATENT DOCUMENTS

| | | |
|---|---|---|
| WO | 2017083444 | 5/2017 |
| WO | 2018022044 | 2/2018 |
| WO | 2018022045 | 2/2018 |
| WO | 2018094123 | 5/2018 |

OTHER PUBLICATIONS

Ugueto et al., "Challenging Assumptions About Fracture Stimulation Placement Effectiveness Using Fiber Optic Distributed Sensing Diagnostics: Diversion, Stage Isolation and Overflushing", Feb. 3, 2015, 6 pages.

Viswanathan et al., "Sequenced Fracture Treatment Diversion Enhances Horizontal Well Completions in the Eagle Ford Shale", Sep. 2014, 5 pages.

Wheaton et al., "A Case Study of Completion Effectiveness in the Eagle Ford Shale Using DAS/DTS Observations and Hydraulic Fracture Modeling", Feb. 1, 2016, 5 pages.

\* cited by examiner

REAL-TIME DIVERTER DIAGNOSTICS AND DISTRIBUTION

TECHNICAL FIELD

The present disclosure relates generally to operations connected with stimulation of production from a wellbore. More particularly, the present disclosure relates to a system that that can make measurements to evaluate the effects of and manage the application of diverter to a wellbore.

BACKGROUND

A well system for oil or gas production can include a wellbore drilled through a subterranean formation. The wellbore can include perforations. Fluid can be injected through the perforations to create fractures in the subterranean formation. The fractures can enable hydrocarbons to flow from the subterranean formation into the wellbore, from which the hydrocarbons can be extracted. A material known as "diverter" can also be pumped into a well during or prior to injection of the fluid. The act of pumping diverter into a wellbore is sometimes referred to as a diverter drop. Diverter accumulates in the wellbore at strategic locations in order to divert the fluid into the portions of the wellbore where its effects can be more advantageous.

The diverter is typically a particulate that comes in various particle sizes. A typical diverter drop includes diverter with a distribution of various particulate sizes. The particle size distribution can be formulated based on past experience with the type of formation involved. The success of the diverter drop can be judged by the eventual well production achieved.

DETAILED DESCRIPTION

Figure 1:
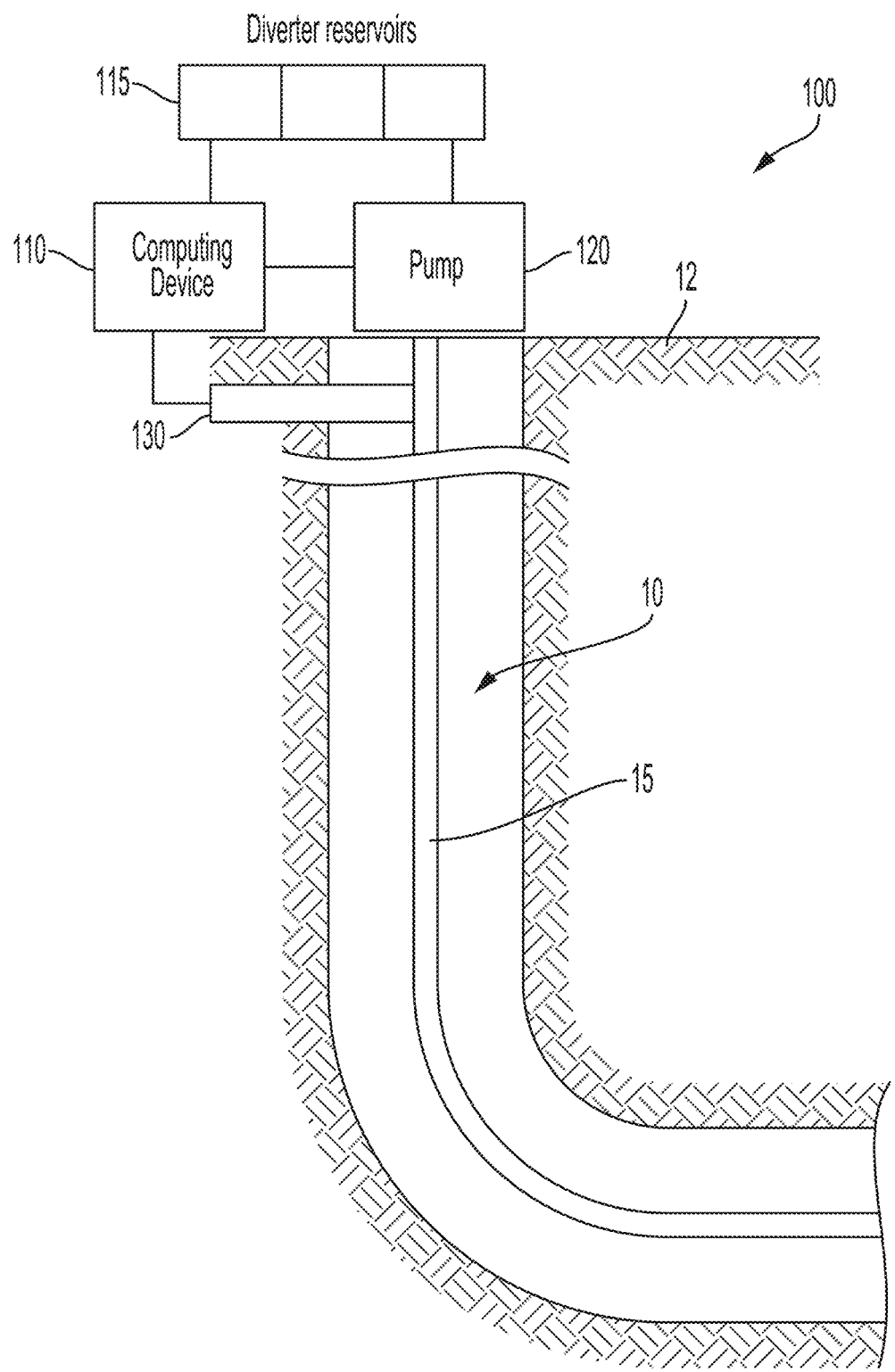
FIG. 1 is a cross-sectional view of a portion of a well environment that includes a system for placement of diverter in the wellbore according to some aspects of the disclosure.

Certain aspects and features relate to a system that determines, from pressure measurements, a result or outcome of a diverter drop in terms of whether far field or near-wellbore bridging, plugging, or diversion at the selected stage of the wellbore has been achieved. The term bridging as used herein may refer to bridging, plugging, diversion, or any combination of these. In some aspects, the system can also include an ability to design a particle size distribution for a diverter stage to be executed in real time by using a small (testing) diverter particulate stage before an actual diverter stage and correlating a pressure response from this testing stage to the particle size distribution of the diverter to be pumped depending on the objective. The system can provide for real-time measurements and real-time decision making in terms of an optimized diverter to be used in a wellbore. In some aspects the flow distribution within a well can be correlated with fracture width to model the optimal diverter particle size distribution for estimating diversion success.

In some examples, a system for diverter diagnostics includes a pressure sensor and a processing device communicatively coupled to the pressure sensor. A non-transitory memory device includes instructions that are executable by the processing device to cause the processing device to perform operations. The operations include measuring an onset of diversion pressure response (DPR) waveform using the pressure sensor during or after pumping diverter into a wellbore and determining that near wellbore bridging or far field bridging has taken place in the wellbore based on a time of pressure response or a displacement volume determined from the onset of the DPR waveform. The operations further include outputting an indication that near wellbore bridging or far field bridging has taken place in the wellbore as a result of pumping the diverter into the wellbore. The term outputting when referring to an indication herein can refer to storing the indication, displaying the indication, as in to an operator, electronically communicating the indication, or any combination of these.

In some examples the system can output an indication of successful diversion by determining a diversion pressure or a diversion index using the onset of DPR waveform and comparing the diversion pressure or diversion index to a target value indicative of a successful diversion. In some examples, the diversion index is determined based on a total uniformity index and a pre-diverter uniformity index. In some examples the diversion index is determined using a machine-learning model. In some examples, the system can produce a fracture width estimate, and increase or decrease a particle size distribution to produce a projected optimal particle size distribution for the diverter based on the fracture width estimate and that near wellbore bridging or far field bridging has taken place. In some examples the system can further access diverter reservoirs including diverter with various particulate sizes and apply diverter with the projected optimal particle size distribution to the wellbore in real time.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

FIG. 1 is a cross-sectional view of an example of a well system 100 including a wellbore 10 in a formation 12. A tubing string 15 is deployed in wellbore 10 and can be used to pump diverter or other materials into the wellbore. The diverter is applied at a desired location of the wellbore. The diverter material may be, for example, a biodegradable polymer. The diverter material is typically formed into a particulate and the particle size can be varied. Diverter applied to a wellbore can include a distribution of particles of various sizes. In some aspects, the computing device 110 can dynamically produce diverter of an optimal particle size distribution by accessing diverter reservoirs 115. Computing device 110 can in some aspects increase or decrease a particle size distribution to produce the optimal particle size distribution from particle sizes available at the diverter reservoirs 115. The computing device 110 can operate pump 120 to pump diverter into the wellbore 10. Such a process can be referred to as a diverter drop. The computing device 110 can record changing pressure values at or near the surface using pressure sensor 130. Recording pressure values over time after a diverter drop can produce a measurement of an onset of diversion pressure response (DPR) waveform, which can be analyzed to determine how the diverter drop is affecting the wellbore and its environment. Wellbore 10 can include horizontal sections, to be discussed below with respect to FIGS. 2 and 3.

Figure 2:
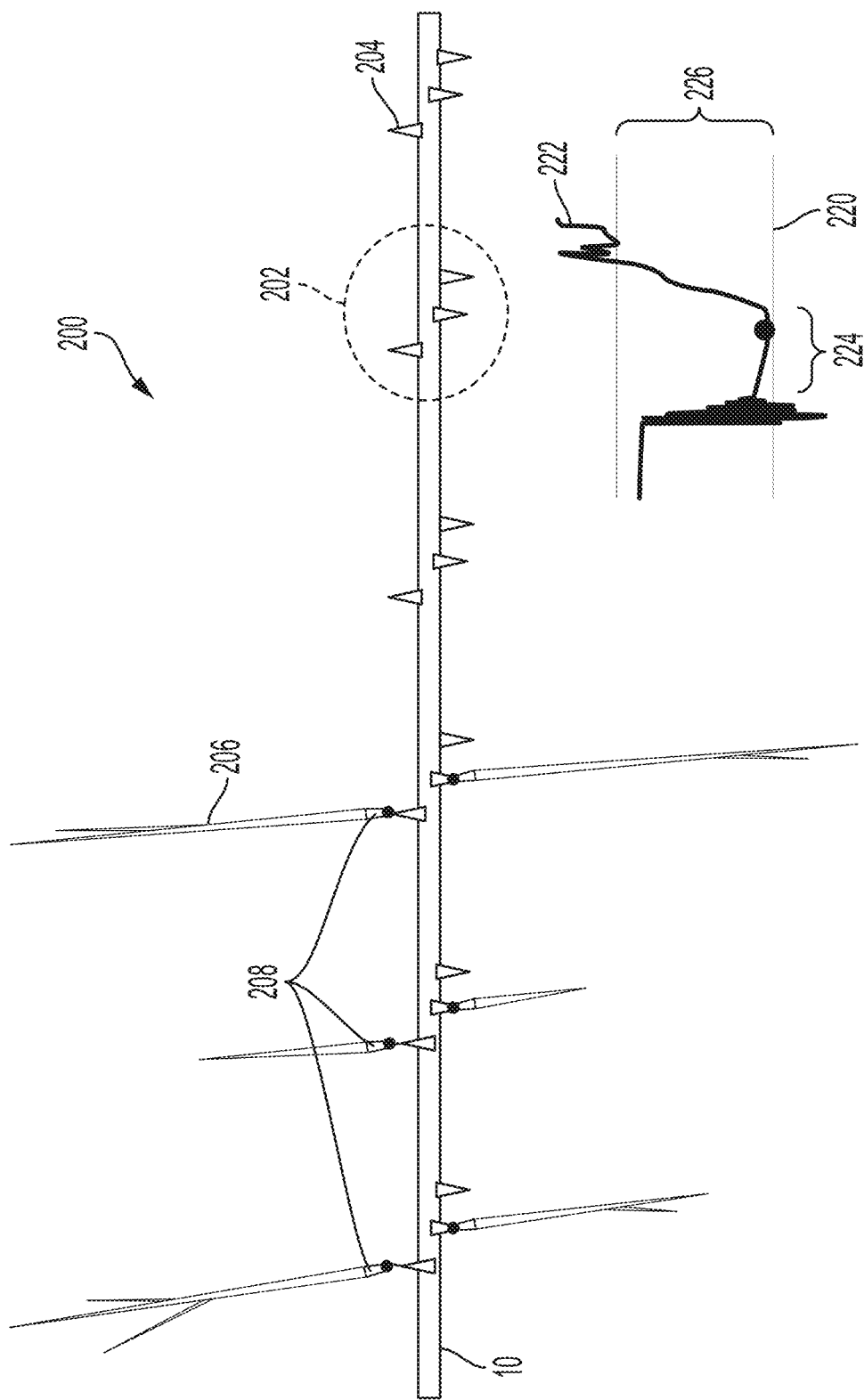
FIG. 2 is an expanded view of a portion of the downhole environment of the wellbore of FIG. 1 according to some aspects of the disclosure.
Figure 3:
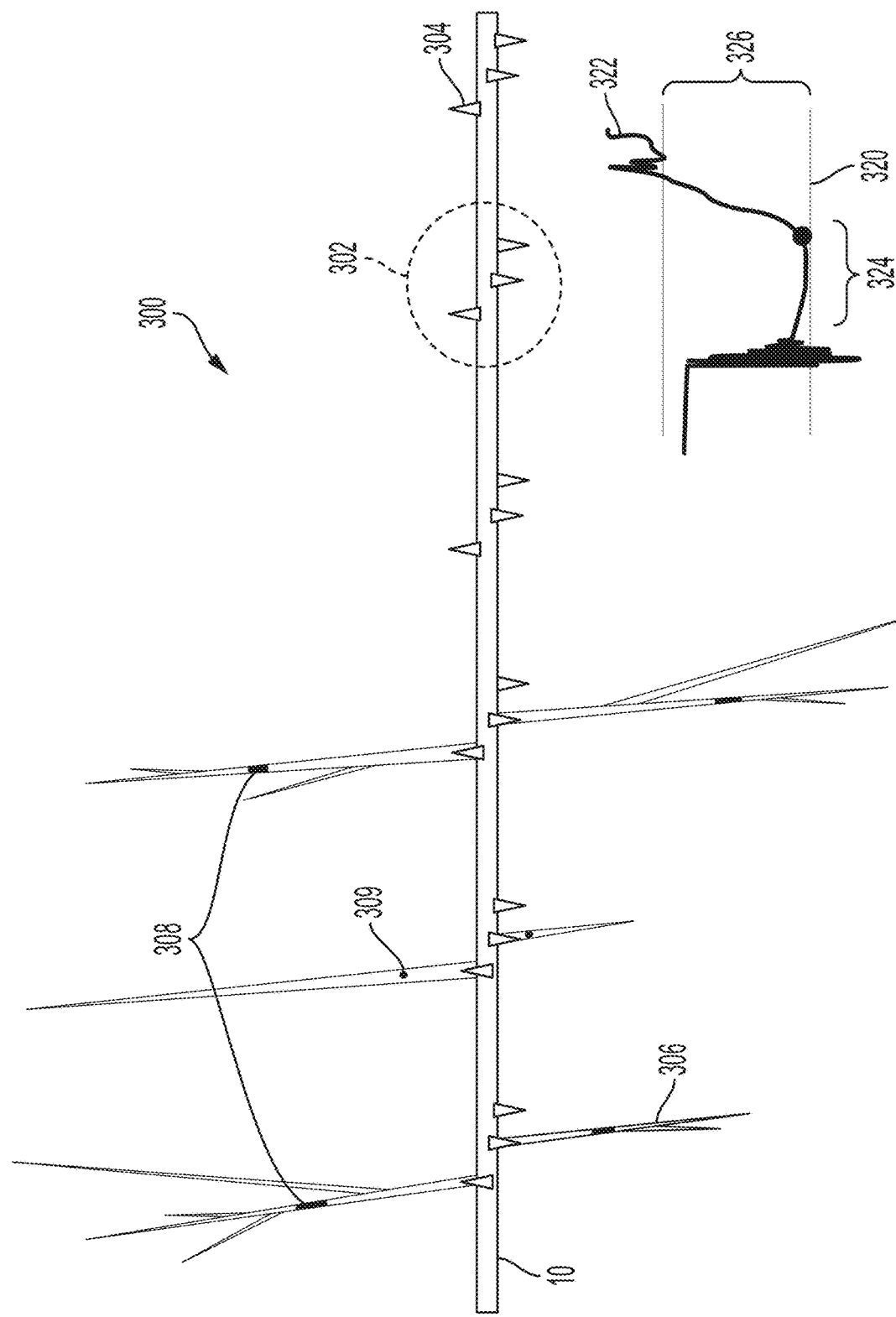
FIG. 3 is an expanded view of another portion of the downhole environment of the wellbore of FIG. 1 according to additional aspects of the disclosure.

FIG. 2 and FIG. 3 are cross-sectional views of portions of the downhole environment associated with well system 100. FIG. 2 illustrates a portion 200 of the downhole environment, which includes a horizontal section of wellbore 10. The uphole well system equipment is to the left in FIG. 2. The horizontal section pictured includes six perforation clusters 202. Each perforation cluster includes three perforations 204. Each perforation cluster represents a location where diverter can be placed, and a specific diverter drop for a particular cluster or area can also be referred to as a diverter stage. Wellbores generally may have more or fewer perforation clusters and each perforation cluster can have more or fewer perforations. The number of perforations can vary from cluster to cluster. The portion 200 of the wellbore environment features a number of fractures 206 in the formation. In FIG. 2, diverter has been applied to the cluster furthest to the left in the figure, resulting in near wellbore bridging at locations 208.

Still referring to FIG. 2, a graph 220 of the pressure response measured by pressure sensor 130 is included. The pressure response shows a characteristic onset of DPR and so may be referred to as an onset of DPR waveform 222. The onset of DPR waveform 222 exhibits a time delay 224 that is indicative of the near wellbore bridging at locations 208. The onset of DPR waveform 222 also exhibits a pressure magnitude 226 that is indicative of how successful or complete the bridging is or has been.

FIG. 3 illustrates a portion 300 of the downhole environment, which includes a horizontal section of wellbore 10. The uphole well system equipment is to the left in FIG. 3. The horizontal section pictured includes perforation clusters 302. Each perforation cluster includes three perforations 304. The portion 300 of the wellbore environment features a number of fractures 306 in the formation. In FIG. 3, diverter has been applied to the cluster furthest to the left in the figure, resulting in far field bridging at locations 308 and incomplete or partially unsuccessful bridging at location 309.

Still referring to FIG. 3, a graph 320 of the pressure response measured by pressure sensor 130 is included. The pressure response shows a characteristic onset of DPR and so may be referred to as an onset of DPR waveform 322. The onset of DPR waveform 322 exhibits a time delay 324 that is indicative of the far field bridging at locations 308. Note that the time delay 324 is noticeably longer than time delay 224 of FIG. 2. The onset of DPR waveform 222 also exhibits a pressure magnitude 326 that is indicative of how successful or complete the bridging is or has been. The magnitude 326 is reduced slightly over what it would otherwise be due to the incomplete bridging at location 309.

Figure 4:
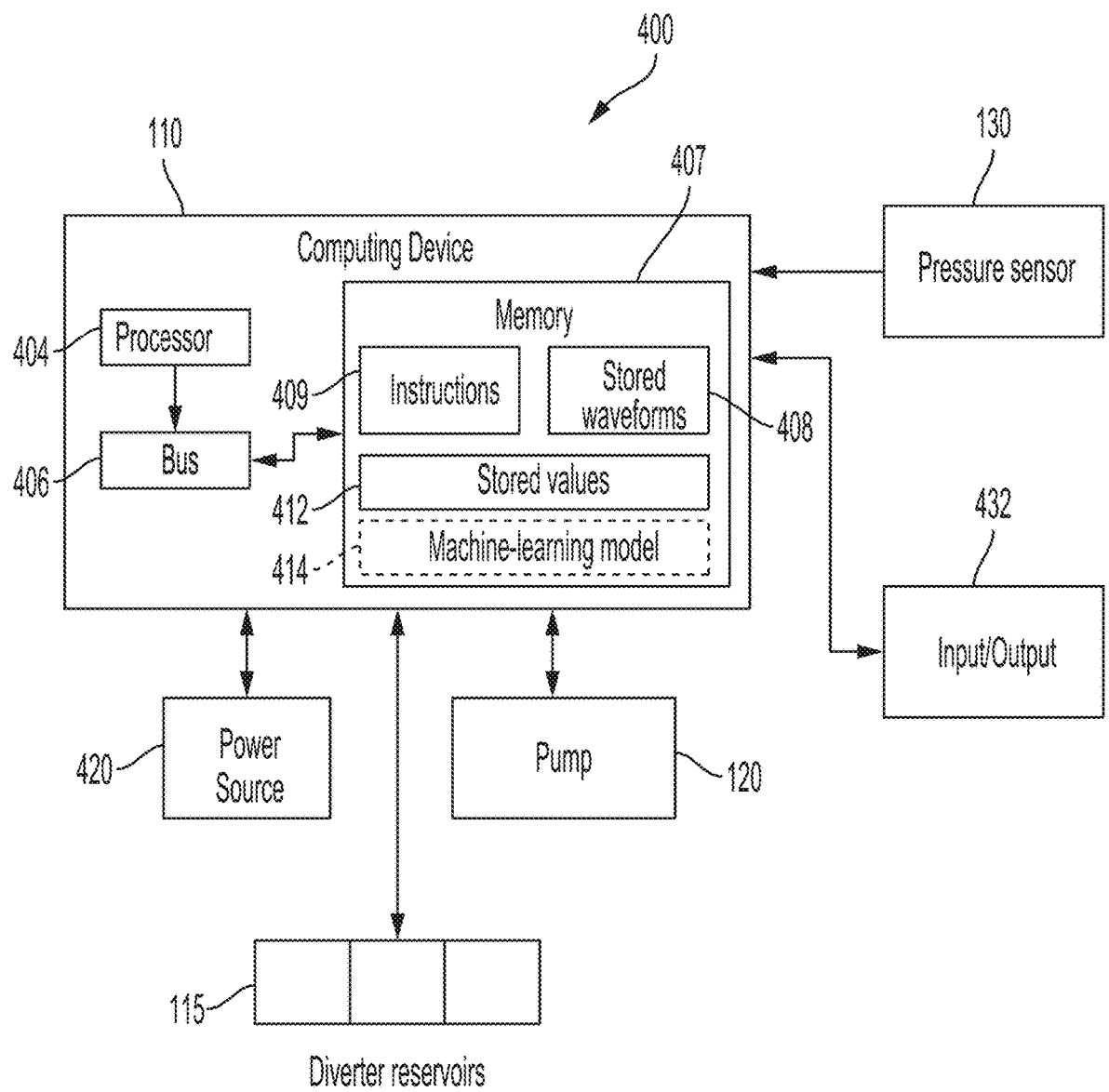
FIG. 4 is a block diagram of a system for providing diverter diagnostics and particle size distribution selection according to some aspects of the disclosure.

FIG. 4 is a block diagram of a system 400 for diverter diagnostics and particle size distribution selection according to some aspects of the disclosure. In some examples, the components shown in FIG. 4 (e.g., the computing device 110 and power source 420) can be integrated into a single structure. For example, the components can be within a single housing. In other examples, the components shown in FIG. 4 can be distributed (e.g., in separate housings) and in electrical communication with each other.

The system 400 includes a computing device 110. The computing device 110 can include a processor 404, a memory 407, and a bus 406. The processor 404 can execute one or more operations for obtaining diverter pressure measurements, and in some cases, measuring the onset of DPR waveform as described above. Onset of DPR waveforms 408 can be stored in memory 407. The processor 404 can execute computer-readable program instructions 409 stored in the memory 407 to perform the operations. The processor 404 can include one processing device or multiple processing devices. Non-limiting examples of the processor 304 include a Field-Programmable Gate Array ("FPGA"), an application-specific integrated circuit ("ASIC"), a microprocessor, etc.

The processor 404 can be communicatively coupled to the memory 407 via the bus 406. The non-volatile memory 407 may include any type of memory device that retains stored information when powered off. Non-limiting examples of the memory 407 include electrically erasable and programmable read-only memory ("EEPROM"), flash memory, or any other type of non-volatile memory. In some examples, at least part of the memory 407 can include a medium from which the processor 304 can read instructions. A non-transitory computer-readable medium can include electronic, optical, magnetic, or other storage devices capable of providing the processor 404 with computer-readable instructions or other program code. Non-limiting examples of a computer-readable medium include (but are not limited to) magnetic disk(s), memory chip(s), ROM, random-access memory ("RAM"), an ASIC, a configured processor, optical storage, or any other medium from which a computer processor can read instructions. The instructions can include processor-specific instructions generated by a compiler or an interpreter from code written in any suitable computer-programming language, including, for example, C, C++, C#, etc.

In some examples, the computer program instructions 409 can perform operations for measuring waveforms 408, for determining how successful a diverter drop is, for determining the type of bridging taking place, and in some examples applying a diverter with a projected optimal particle size distribution to the wellbore in real time. These operations can, as an example, make use of stored values 412 for thresholds, targets, indexes, and particle sizes. These instructions 409 can also optionally make use of a machine-learning model 414 to determine successful diversion based on a calculated diversion index.

The system 400 can include a power source 420. The power source 420 can be in electrical communication with the computing device 110. In some examples, the power source 420 can include a battery or an electrical cable (e.g., a wireline). In some examples, the power source 420 can include an AC signal generator. The computing device 110 can receive input from pressure sensor 130 and in some aspects control diverter reservoirs 115. System 400 in this example also includes input/output interface 432. Input/output interface 432 can connect to a keyboard, pointing device, display, and other computer input/output devices, including a wires or wireless network adapter for remote access or to send diverter particle size distributions, waveforms, or other information to a remote location. An operator may provide input using the input/output interface 432. Indications of the type of bridging occurring, diversion success, waveforms, or other data related to the operation of the system can also be displayed to an operator through a display that is connected to or is part of input/output interface 432.

Figure 5:
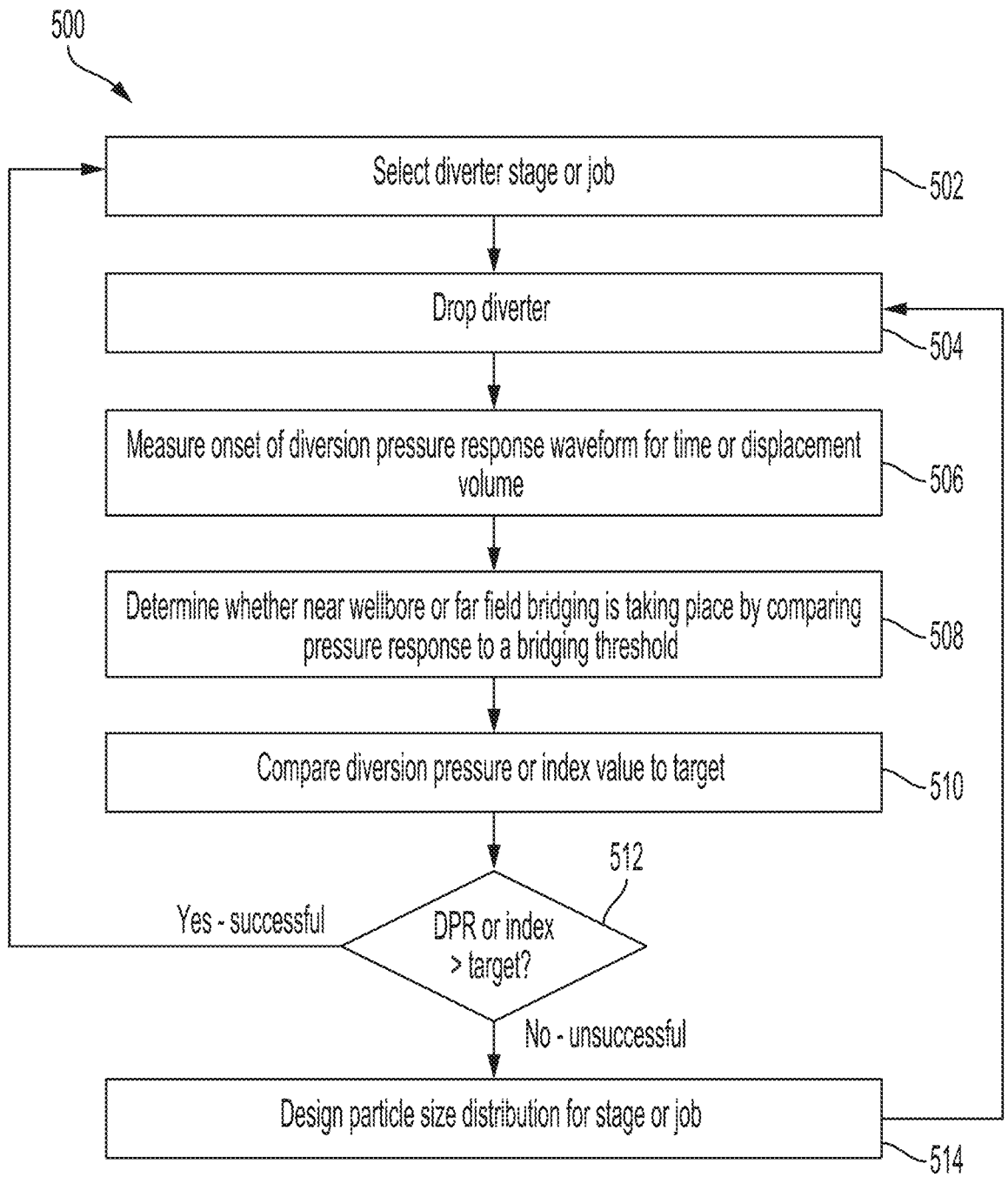
FIG. 5 is a flowchart of a process for providing diverter diagnostics and particle size distribution selection according to some aspects of the disclosure.

FIG. 5 is an example of a flowchart of a process 500 for diverter diagnostics and particle size distribution selection according to some aspects of the disclosure. At block 502 a diverter stage or job is selected. This selection can be automated or provided by operator input. At block 504, a diverter drop occurs. At block 506, processor 404 uses pressure sensor 130 to measure the onset of DPR waveform to determine time of pressure or displacement volume of the response. At block 508, processor 404 determine whether near wellbore or far field bridging is taking place by comparing the time or volume pressure response to a bridging threshold. The bridging threshold can be pre-selected based on experience with the type of formation or the configuration of the wellbore. As can be observed in the graphs that follow and are discussed below, 200 seconds is a typical time-based threshold and 2000 gallons is a typical volume-based threshold.

Still referring to FIG. 5, the level of diversion success can be determined in part by processor 404 comparing the diversion pressure level or a diversion index to a target value at block 510. The value of pressure (226 and 326 in FIGS. 2, and 3, respectively) for successful diversion is selected based on experience with the type of formation and well configuration, however 500 psi is typical. Target values can run between 50 psi and 5000 psi. If a diversion index is used, successful diversion is indicated with a diversion index greater than zero. Further details of how the diversion index is determined are discussed below with respect to FIG. 9. At block 512, process 500 for the current stage or job ends if diversion is successful and another stage or job can be selected at block 502. Otherwise, if the diversion is unsuccessful at block 512, a new particle size distribution is designed (or re-designed) for the job or stage at block 514. The determination of a new particle size distribution for the diverter will be discussed below with respect to FIG. 10.

Figure 6:
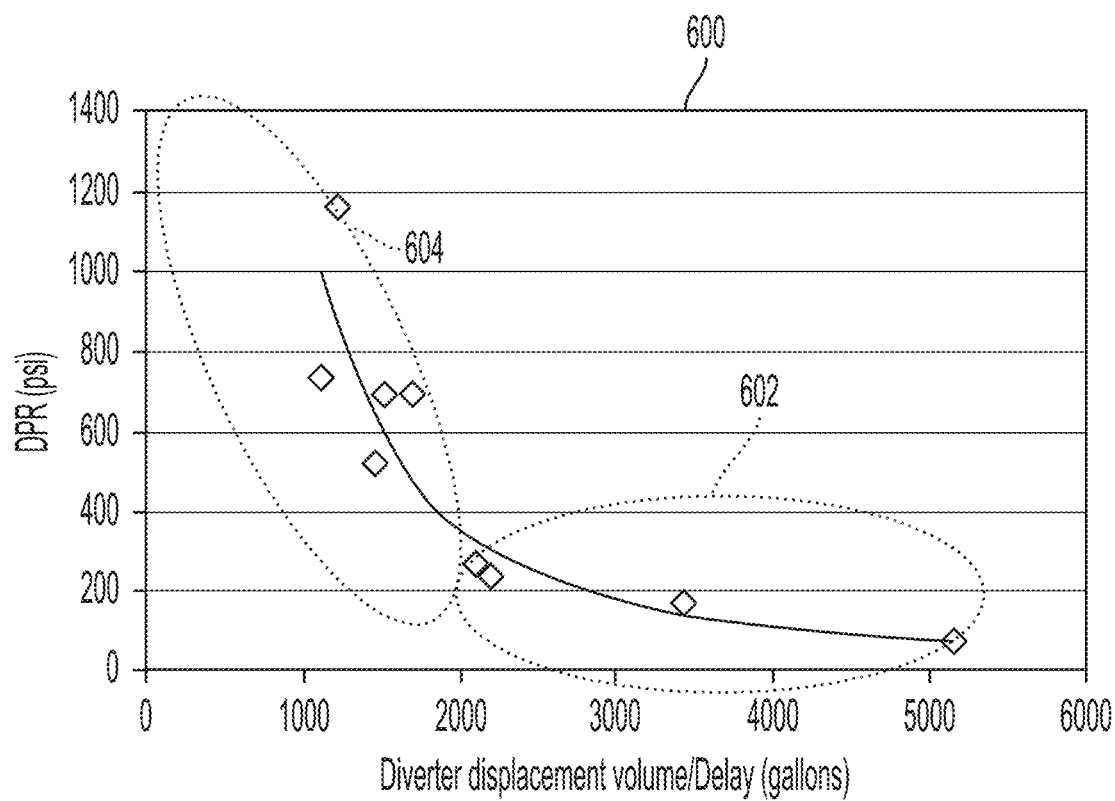
FIG. 6, FIG. 7, and FIG. 8 are graphs of diverter pressure response according to some aspects of the disclosure.
Figure 7:
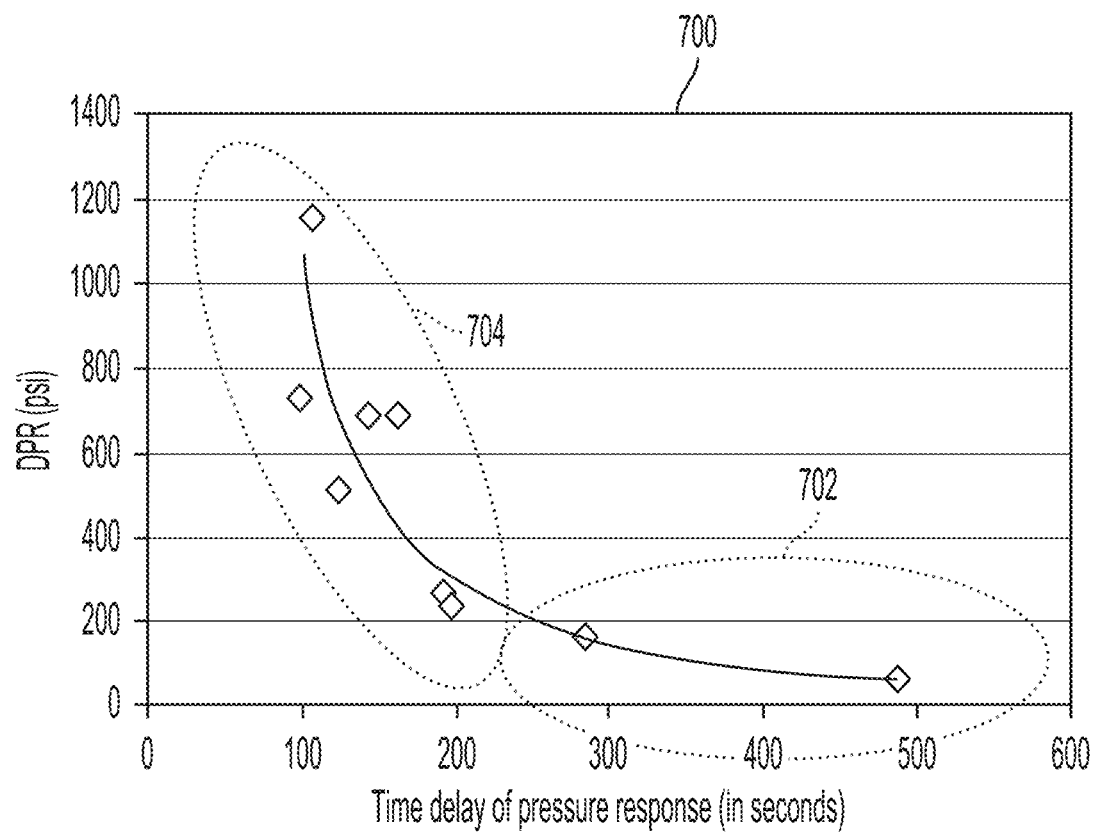
Figure 8:
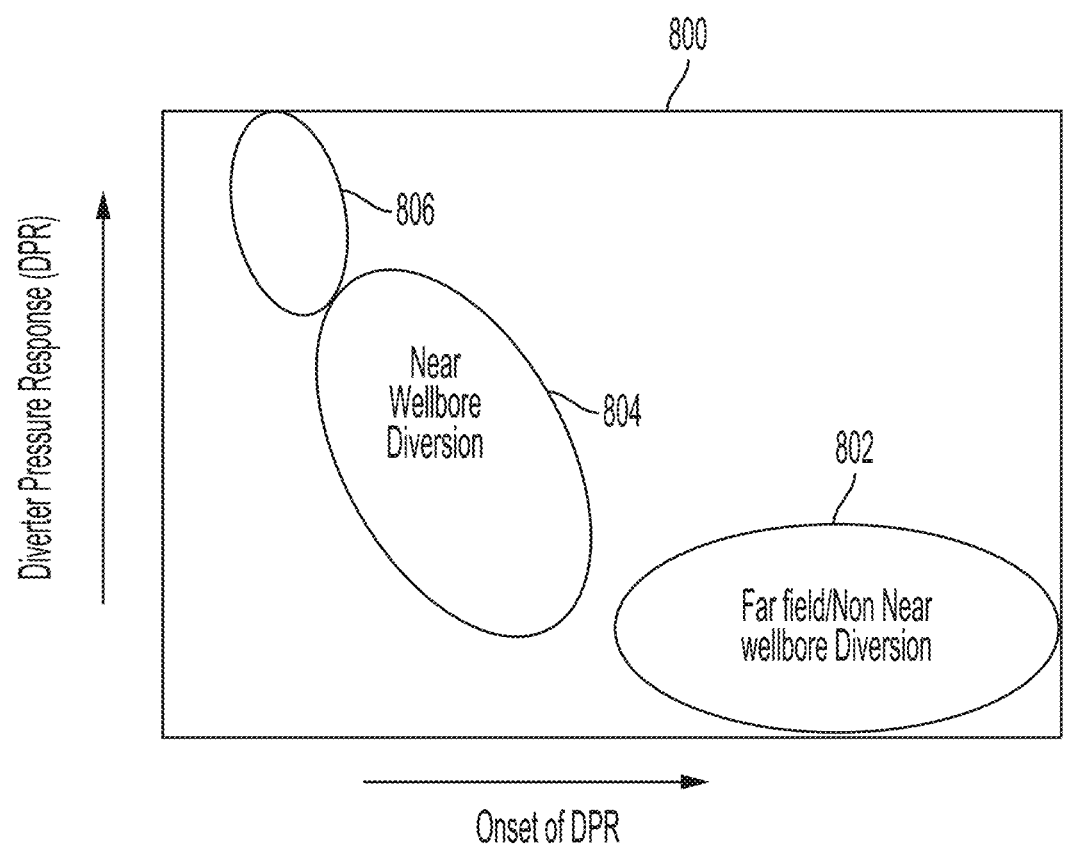

FIG. 6, FIG. 7, and FIG. 8 are graphs illustrating an example of data for onset of DPR for a diverter drop. FIG. 6 is a graph 600 of onset of DPR data for diverter pressure response in psi versus onset of DPR determined by displacement volume. Each data point is for a different stage in a wellbore. Data points 602 suggest far field bridging for those stages. Data points 604 suggest near wellbore bridging for those stages. FIG. 7 is a graph 700 of the same onset of DPR data as FIG. 6, but in this case the diverter pressure response in psi is plotted versus onset of DPR/delay determined by time. Data points 702 suggest far field bridging for those stages. Data points 704 suggest near wellbore bridging for those stages.

FIG. 8 is a generalized schematic graph 800 that illustrates typical data 802 for far field bridging and typical data 804 for near wellbore bridging. However, graph 800 has been extended as compared to the previous graphs in terms of pressure response to include typical data 806. Such high pressure, early response data can indicate inter-perforation diversion within a cluster or clusters. Knowledge of inter-perforation diversion can be useful in analyzing the effects of a diverter drop.

Figure 9:
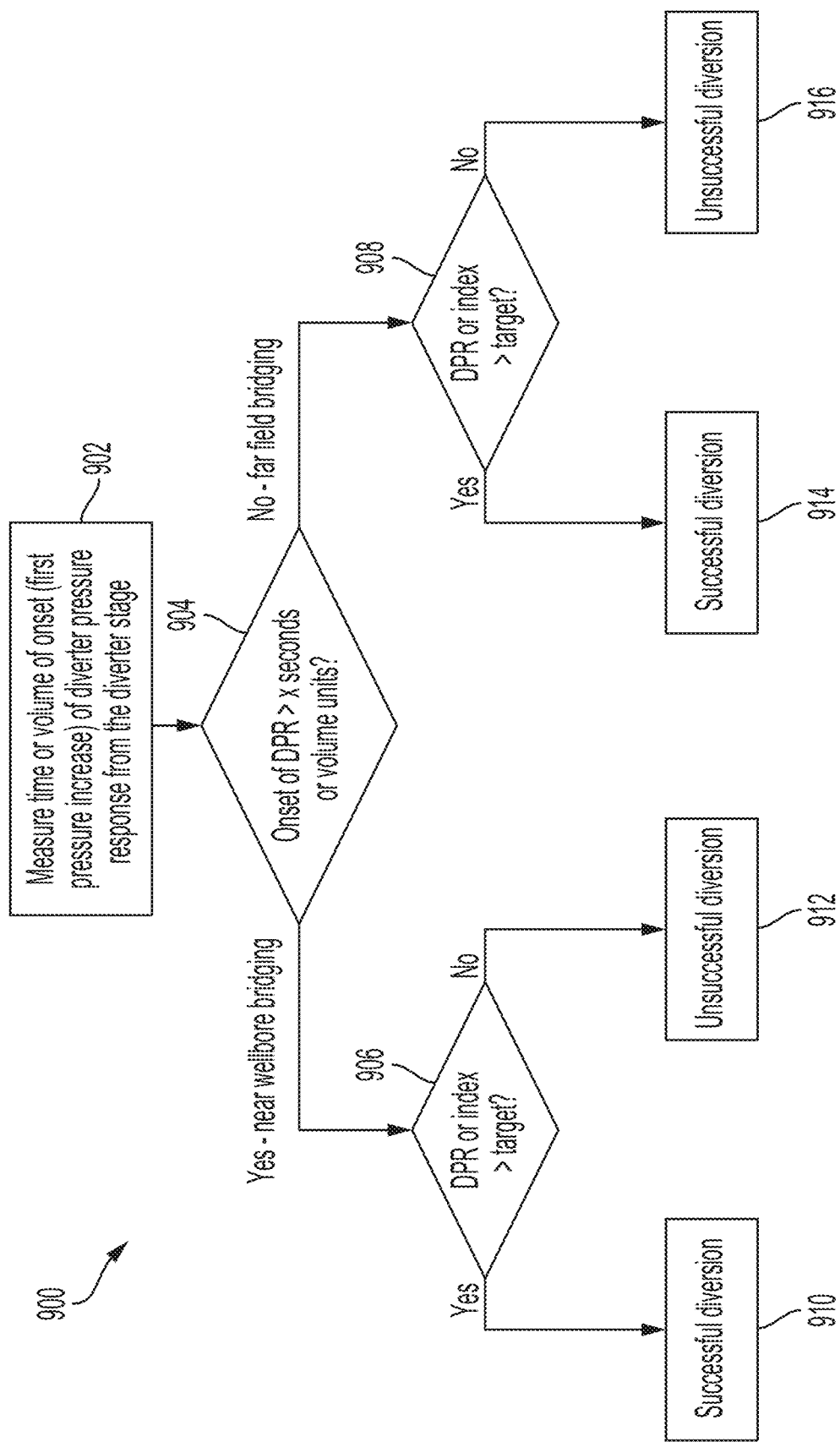
FIG. 9 is a flowchart of a process for providing diverter diagnostics according to some aspects of the disclosure.

FIG. 9 is an example of a flowchart of a process 900 for providing diverter diagnostics. Process 900 can provide an estimation of diversion success and the result of the diverter drop in terms of whether far field of near-wellbore bridging, plugging, or diversion has been achieved. This involves the measuring the displacement volume or time required for onset of DPR. A higher or more delayed onset of DPR means a longer time or higher volume when seeing the first pressure signal on the surface since the diverter hits downhole in real time and vice versa. At block 902 of process 900, the time or volume of first onset or first pressure increase is determined from measuring the onset of DPR wave. At block 904 a determination is made regarding whether the onset of DPR value in seconds or volume units is greater than a selected value, which may be referred to herein as a bridging threshold. If the answer is yes, near wellbore bridging is occurring or has occurred. If the answer is no, far field bridging or non-near wellbore bridging is occurring or has occurred. The time or displacement volume of onset of DPR can be used to differentiate or classify diverter bridging as near wellbore or far field.

At block 906 and block 908 of FIG. 9, another criteria, a target DPR pressure can be used to classify the success of failure of a diversion technique depending on the objective. Block 910 indicates a successful near wellbore diversion and block 912 indicates an unsuccessful near wellbore diversion for the near wellbore bridging case. Similarly, Block 914 indicates a successful near wellbore diversion and block 916 indicates an unsuccessful near wellbore diversion for the far field bridging case. A diversion index can also be used to make the determinations at blocks 906 and 908. The calculation of a diversion index will be discussed below with respect to FIG. 11.

Figure 10A:
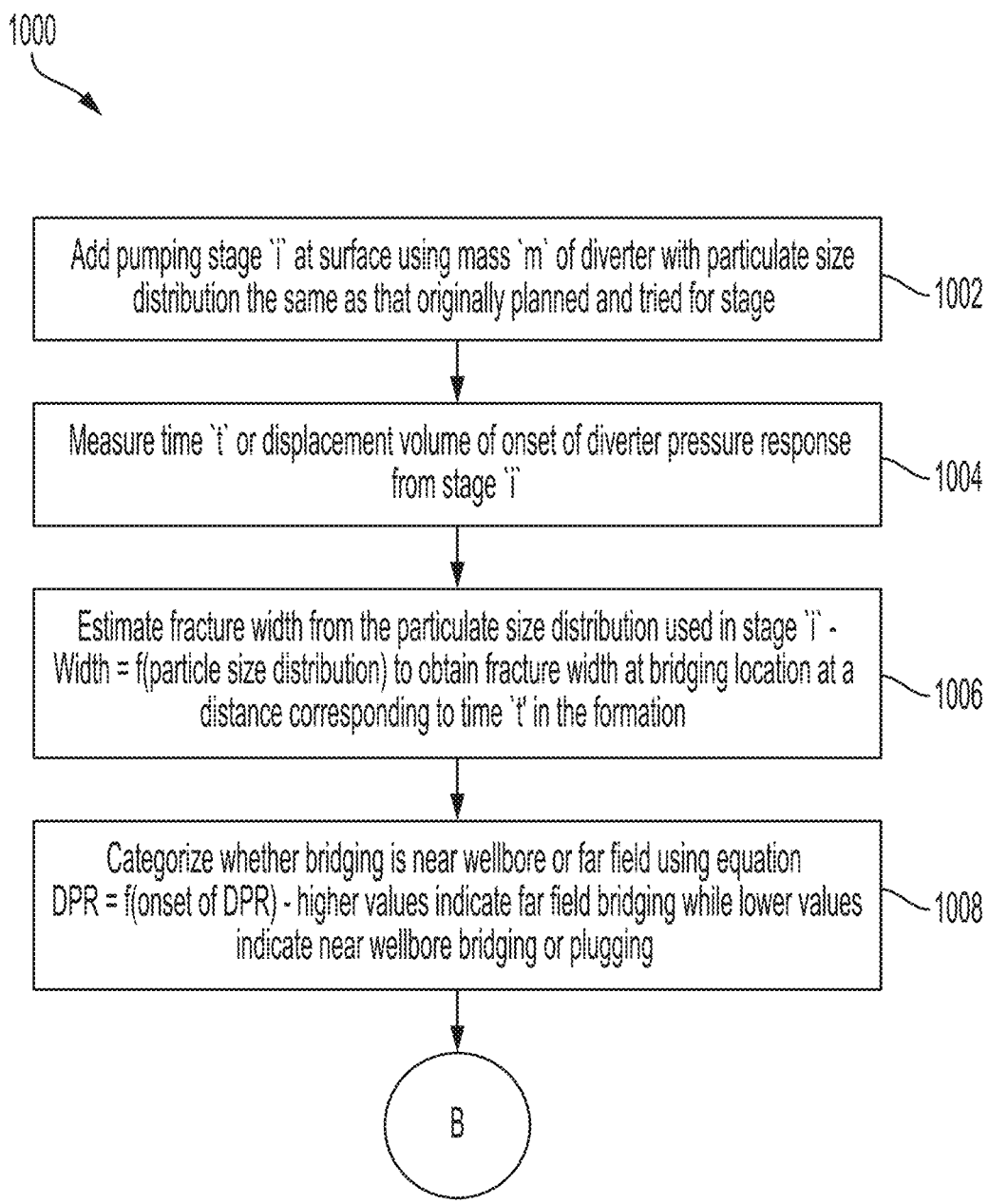
FIG. 10A and FIG. 10B show a flowchart of a process for providing diverter particle size distribution selection according to some aspects of the disclosure. The flowchart is split into two parts for clarity of illustration and may be referred to herein as FIG. 10.
Figure 10B:
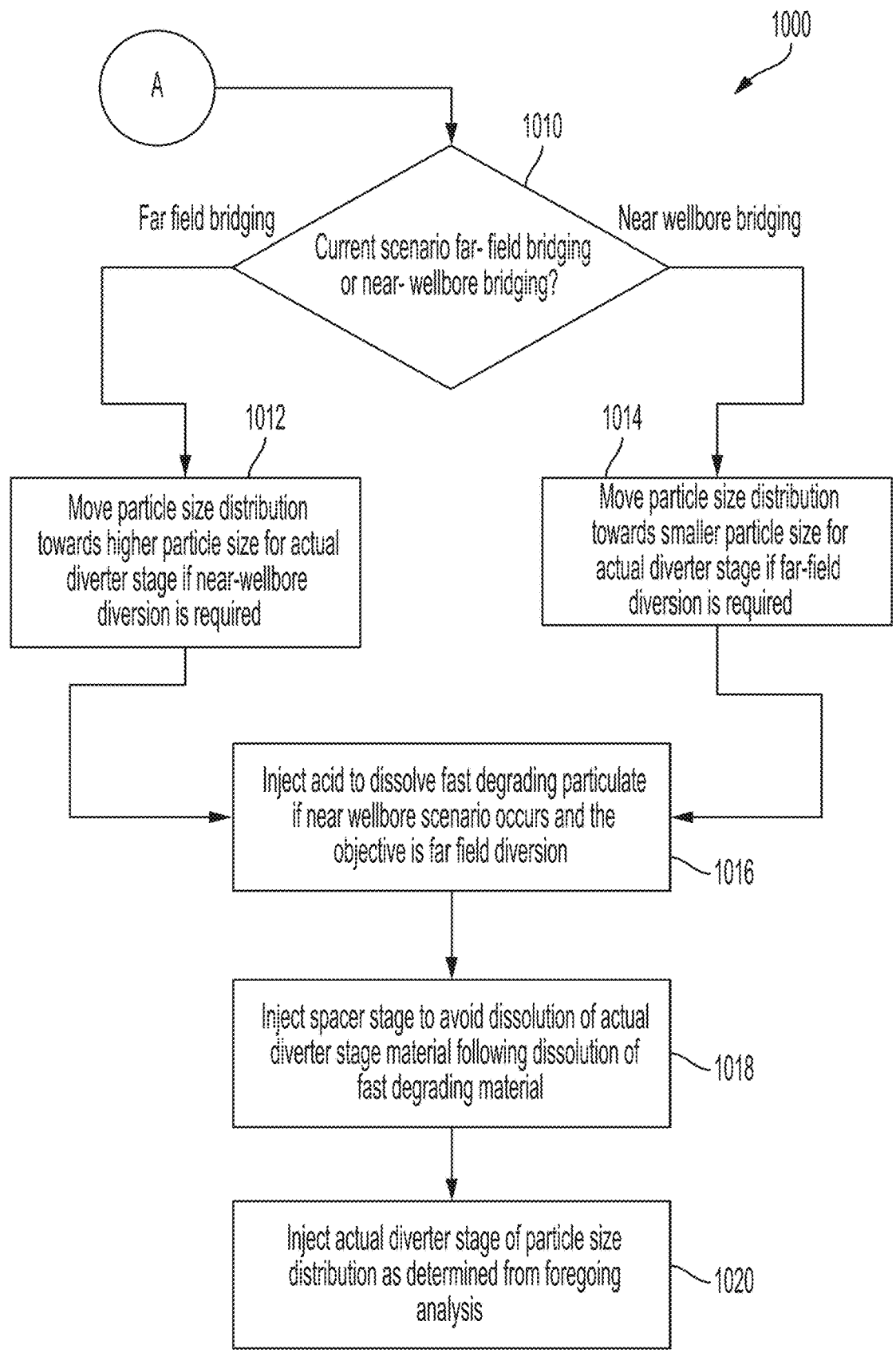

FIGS. 10A and 10B show an example of a process 1000 for providing particle size distribution selection according to some aspects of the disclosure. Process 1000 provides for the design or re-design of a particle size distribution for a diverter stage to be executed in real-time by adding a small stage (testing stage) of particulate before an actual diverter stage. The test diverter drop is analyzed, and a response is correlated for the testing stage to the actual particle size distribution of the diverter to be pumped depending on the objective of near wellbore or far field diversion. In order to minimize delay until starting a job it may be desirable for the test diverter to use fast-degrading particulate. At block 1002 of FIG. 10A, a small pumping stage of diverter i is added at the surface using mass m of diverter with particulate size distribution the same as that previously planned or already tried for the stage. A slightly smaller particle size distribution can be used as well. At block 1004, the time t or displacement volume of onset of diverter pressure response from stage i is measured. At block 1006, the system estimates the fracture width from the particulate size distribution used in stage i by setting fracture width as a function of the particle size distribution:

$$\text{width} = f(\text{particle size distribution}).$$

This function is used to obtain fracture width at the bridging location at a distance corresponding to time t in the formation. In one example, fracture width is a constant times the mean of the particle size pumped, for example:

$$\text{width} = a \cdot \text{mean particle size},$$

where a is an integer from 1 to 10.

The downhole flow distribution is a function of onset of PDR and the difference in pressure between the time of the response and the time before the response:

downhole flow distribution=$f$(onset of DPR/time delay, $\Delta$ pressure response).

At block 1008, the system categorizes whether bridging is near wellbore or far field using the equation:

DPR=$f$(onset of DPR/time delay of pressure response/displacement volume).

Higher values indicate far field bridging while lower values indicate near wellbore bridging.

Continuing with process 1000 in FIG. 10B, at block 1010, a determination is made as to whether near wellbore bridging or far field bridging is desired for the current scenario. This selection can be input by an operator or retrieved from memory. If a far field bridging scenario is of interest, at block 1012, the particle size distribution is moved towards higher particle size for the actual diverter stage. If near wellbore bridging is the scenario of interest, at block 1014, the particle size distribution is moved towards smaller particle size for the actual diverter stage. Whether the particle size distribution is smaller or larger depends on the objective, far field diversion or near wellbore diversion. The distribution of particles of a given size can be expressed as a ratio:

particle size/size distribution of diverter=$f$(onset of DPR/time delay), which in some examples is:

particle size/size distribution of diverter=$b$·onset of DPR/time delay, where $b>1$ if current scenario is far field and the objective is near-wellbore, and $b<1$ if current scenario is near-wellbore and the objective is far field. A larger constant $b$ indicates a larger fraction of large size particles and a smaller constant $b$ indicates a larger fraction of small size particles.

Continuing with process 1000 in FIG. 10B, to complete the testing at block 1016, acid is injected into the wellbore to dissolve particulate if a near wellbore bridging scenario occurs and the objective is far field diversion. In this example, the process is aided by the use of fast degrading diverter material. At block 1018, a spacer stage of diverter is injected to avoid dissolution of desired actual diverter following dissolution of the fast degrading material. At block 1020 an actual diverter stage is dropped using the above analysis. This diverter has a particle size distribution as determined above. Blocks 1002, 1004, and 1006 of process 1000 can be executed at the end of a treatment or job to estimate fracture widths at a certain flow rate just before shut-in.

A number of control factors and assumptions are used to determine how much to adjust the particle size distribution in blocks 1012 and 1014 of process 1000. Control factors include dropping rate, landing rate, relaxation time, particle average size, particle maximum size, particle distribution asymmetry, diverter concentration, diverter mass, and fluid rheology. Measurements can include in addition to onset of DPR time or displacement volume and DPR magnitude as already discussed, DPR slope, and flow distribution (discussed further below). For testing, initial assumptions can be made as to cluster effective width, cluster effective length to a bridge, the number of fractures associated with the cluster, and the desired diversion type. A relaxation time is defined as the time for which the downhole conditions are kept at a rate lower than the design rate until diverter hits downhole.

As one example of a scenario, in a first cycle or test stage where near wellbore bridging is desired in a wellbore with six clusters, assume no DPR is detected. It can also be assumed that the sum of cluster lengths to a bridge is very high, the sum of effective cluster widths is very high, and the number of fractures is low. In this case the parameters of a solution can include leaving the dropping rate (diverter addition rate) unchanged, decreasing the landing rate, increasing the relaxation time, increasing the average particle size, increasing the maximum particle size, maximizing the particle distribution asymmetry, increasing the diverter concentration, and increasing the diverter mass.

As another example of a scenario, in a first cycle or test stage where near wellbore bridging is desired in a wellbore with six clusters, assume an onset of DPR waveform that exhibits moderate pressure magnitude and a long time delay. It can further be assumed that the sum of cluster lengths to a bridge is high, the sum of effective cluster widths is moderate, and the number of fractures is moderate. In this case the parameters of a solution can include leaving the dropping rate unchanged, decreasing the landing rate, leaving the relaxation time unchanged, increasing the average particle size, increasing the maximum particle size, maximizing the particle distribution asymmetry, increasing the diverter concentration, and leaving the diverter mass unchanged.

A diversion index (DI) can be used to indicate successful bridging in lieu of using a target value for the pressure response. A DI greater than zero indicates a successful diversion and a DI less than zero indicates an unsuccessful diversion. The DI is the resultant value when the pre-diverter uniformity index (UI) is subtracted from the total UI. A predicted DI can be calculated by processor 404 using machine-leaning model 414 of FIG. 4. The machine-learning model gathers readings from standard wellbore data acquisition system (DAS) sensors to determine the uniformity index (UI). The uniformity index is normally calculated as:

$UI$=1−standard deviation of flow between clusters/mean flow in cluster.

Figure 11:
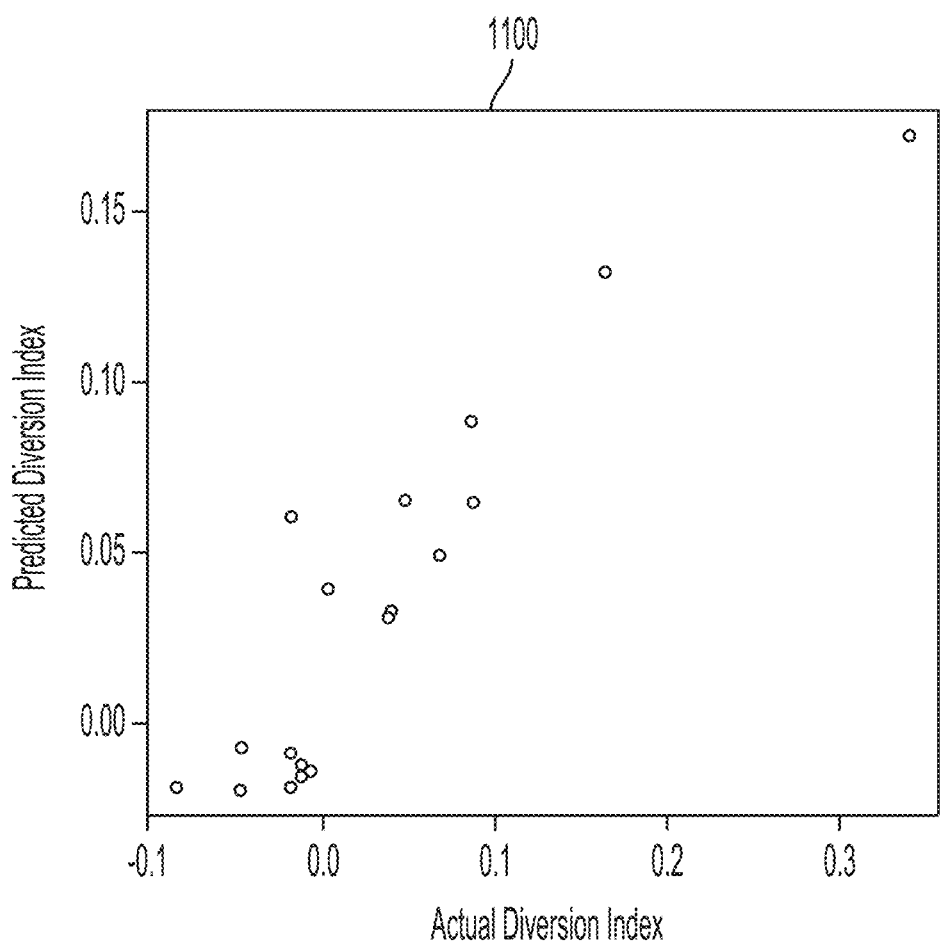
FIG. 11 is a graph showing diversion index data according to some aspects of the disclosure.

The machine-learning model records DAS telemetry and calculates the UI over time. The DAS telemetry can include fiber optic measurements of flow distribution. From this information and with total magnitude of DPR (i.e. 226 in FIG. 2 or 336 in FIG. 3), the machine-learning model can forecast the UI and hence the DI for a diverter with a given particle size distribution used at a specific perforation cluster and allow the processor 404 to perform a simulated test stage. FIG. 11 is a graph 1100 showing the predicted diversion index plotted against the actual diversion index for a number of test stages. The predicted diversion index was supplied by a machine-learning model as described above. It should be noted that the term test stage can apply to any diverter stage that is used to make a determination of an optimal diverter particle size distribution. Any diverter application can serve as a test stage, even if there was no intent to use the application as a test stage at the time of application. A test stage can be any actual diverter stage in a multiple diverter cycle job or a small diverter added in proppant stage just before the actual diverter stage.

Terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprises" or "comprising," when used in this specification, specify the presence of stated features, steps, operations, elements, or components, but do not preclude the presence or addition of one or more other features, steps, operations, elements, components, or groups thereof. Additionally, comparative, quantitative terms such as "above," "below," "less," and "greater" are intended to encompass the concept of equality, thus, "less" can mean not only "less" in the strictest mathematical sense, but also, "less than or equal to."

Unless specifically stated otherwise, it is appreciated that throughout this specification that terms such as "processing," "calculating," "determining," "operations," or the like refer to actions or processes of a computing device, such as the controller or processing device described herein, that can manipulate or transform data represented as physical electronic or magnetic quantities within memories, registers, or other information storage devices, transmission devices, or display devices. The order of the process blocks presented in the examples above can be varied, for example, blocks can be re-ordered, combined, or broken into sub-blocks. Certain blocks or processes can be performed in parallel. The use of "configured to" herein is meant as open and inclusive language that does not foreclose devices configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Elements that are described as "connected," "connectable," or with similar terms can be connected directly or through intervening elements.

In some aspects, a system for monitoring drill cuttings is provided according to one or more of the following examples. As used below, any reference to a series of examples is to be understood as a reference to each of those examples disjunctively (e.g., "Examples 1-4" is to be understood as "Examples 1, 2, 3, or 4").

Example 1. A system includes a pressure sensor, a processing device communicatively coupled to the pressure sensor, and a non-transitory memory device including instructions that are executable by the processing device to cause the processing device to perform operations. The operations include measuring an onset of diversion pressure response (DPR) waveform using the pressure sensor during or after pumping diverter into a wellbore, determining that near wellbore bridging or far field bridging has taken place in a wellbore based on a time delay of pressure response or displacement volume determined from the onset of DPR waveform, and outputting an indication that near wellbore bridging or far field bridging has taken place in the wellbore as a result of pumping the diverter into the wellbore.

Example 2. The system of example 1 wherein the operations further include determining a projected optimal particle size distribution for the diverter and for an objective of near wellbore or far field diversion based on at least one of a fracture width or the indication that near wellbore bridging or far field bridging has taken place for a test stage.

Example 3. The system of example(s) 1-2 further including multiple diverter reservoirs. Additionally, the operations further include accessing the diverter reservoirs to produce the diverter with the projected optimal particle size distribution, and applying the diverter with the projected optimal particle size distribution to the wellbore in real time.

Example 4. The system of example(s) 1-3 wherein determining that near wellbore bridging or far field bridging has taken place includes determining the time delay of pressure response or displacement volume from the onset of DPR waveform, and comparing the time delay of pressure response or displacement volume to a bridging threshold.

Example 5. The system of example(s) 1-4 wherein the operations further include determining a diversion index using the onset of DPR waveform and at least one of a machine-learning model or a total uniformity index, comparing the diversion index to a target value indicative of a successful diversion, and outputting an indication of successful diversion based on comparing the diversion index to the target value.

Example 6. The system of example(s) 1-5 wherein the machine-learning model is used for determining the diversion index.

Example 7. The system of example(s) 1-6 wherein the operations further include, based on the indication that near wellbore bridging or far field bridging has taken place for a test stage, adjusting at least one of diverter addition rate, diverter landing rate, relaxation time, or fluid rheology.

Example 8. A method including measuring, by a processor, an onset of diversion pressure response (DPR) waveform using a pressure sensor during or after pumping diverter into a wellbore, determining, by the processor, that near wellbore bridging or far field bridging has taken place in a wellbore based on a time delay of pressure response or displacement volume determined from the onset of DPR waveform, and outputting, by the processor, an indication that near wellbore bridging or far field bridging has taken place in the wellbore as a result of pumping the diverter into the wellbore.

Example 9. The method of example 8 further including determining a projected optimal particle size distribution for the diverter and for an objective of near wellbore or far field diversion based on at least one of a fracture width or the indication that near wellbore bridging or far field bridging has taken place for a test stage.

Example 10. The method of example(s) 8-9 including accessing multiple diverter reservoirs to produce the diverter with the projected optimal particle size distribution, and applying the diverter with the projected optimal particle size distribution to the wellbore in real time.

Example 11. The method of example(s) 8-10 wherein determining that near wellbore bridging or far field bridging has taken place further includes determining the time delay of pressure response or displacement volume from the onset of DPR waveform; and comparing the time delay of pressure response or displacement volume to a bridging threshold.

Example 12. The method of example(s) 8-11 further including determining a diversion index using the onset of DPR waveform and at least one of a machine-learning model or a total uniformity index, comparing the diversion index to a target value indicative of a successful diversion, and outputting an indication of successful diversion based on comparing the diversion index to the target value.

Example 13. The method of example(s) 8-12 wherein the machine-learning model is used for determining the diversion index.

Example 14. The method of example(s) 8-13 including, based on the indication that near wellbore bridging or far field bridging has taken place for a test stage, adjusting at least one of diverter addition rate, diverter landing rate, relaxation time, or fluid rheology.

Example 15. A non-transitory computer-readable medium that includes instructions that are executable by a processor for causing the processor to perform operations related to applying diverter to a hydrocarbon well. The operations include measuring an onset of diversion pressure response (DPR) waveform using a pressure sensor during or after pumping diverter into a wellbore, determining that near wellbore bridging or far field bridging has taken place in a wellbore based on a time delay of pressure response or displacement volume determined from the onset of DPR waveform, and outputting an indication that near wellbore bridging or far field bridging has taken place in the wellbore as a result of pumping the diverter into the wellbore.

Example 16. The non-transitory computer-readable medium of example 15 wherein the operations further include determining a projected optimal particle size distribution for the diverter and for an objective of near wellbore or far field diversion based on at least one of a fracture width or the indication that near wellbore bridging or far field bridging has taken place for a test stage.

Example 17. The non-transitory computer-readable medium of example(s) 15-16 wherein the operations further include accessing multiple diverter reservoirs to produce the diverter with the projected optimal particle size distribution, and applying the diverter with the projected optimal particle size distribution to the wellbore in real time.

Example 18. The non-transitory computer-readable medium of example(s) 15-17 wherein determining that near wellbore bridging or far field bridging has taken place further includes determining the time delay of pressure response or displacement volume from the onset of DPR waveform, and comparing the time delay of pressure response or displacement volume to a bridging threshold.

Example 19. The non-transitory computer-readable medium of example(s) 15-18 wherein the operations further include determining a diversion index using the onset of DPR waveform and at least one of a machine-learning model or a total uniformity index, comparing the diversion index to a target value indicative of a successful diversion, and outputting an indication of successful diversion based on comparing the diversion index to the target value.

Example 20. The non-transitory computer-readable medium of example(s) 15-19 wherein the operations further include based on the indication that near wellbore bridging or far field bridging has taken place for a test stage, adjusting at least one of diverter addition rate, diverter landing rate, relaxation time, or fluid rheology.

The foregoing description of the examples, including illustrated examples, has been presented only for the purpose of illustration and description and is not intended to be exhaustive or to limit the subject matter to the precise forms disclosed. Numerous modifications, combinations, adaptations, uses, and installations thereof can be apparent to those skilled in the art without departing from the scope of this disclosure. The illustrative examples described above are given to introduce the reader to the general subject matter discussed here and are not intended to limit the scope of the disclosed concepts.

What is claimed is:

1. A system comprising:
   a pressure sensor;
   a processing device communicatively coupled to the pressure sensor; and
   a non-transitory memory device comprising instructions that are executable by the processing device to cause the processing device to perform operations comprising:
      measuring an onset of diversion pressure response (DPR) waveform using the pressure sensor during or after pumping a diverter into a wellbore;
      determining that near wellbore bridging or far field bridging has taken place in a wellbore based on a time delay of pressure response or displacement volume determined from the onset of DPR waveform;
      outputting an indication that near wellbore bridging or far field bridging has taken place in the wellbore as a result of pumping the diverter into the wellbore; and
      determining a projected optimal particle size distribution for the diverter and for an objective of near wellbore or far field diversion based at least on the indication that near wellbore bridging or far field bridging has taken place for a test stage.

2. The system of claim 1 wherein the operation of determining the projected optimal particle size distribution for the diverter and for the objective of near wellbore or far field diversion is further based on at least a fracture width.

3. The system of claim 2 further comprising a plurality of diverter reservoirs and wherein the operations further comprise:
   accessing the plurality of diverter reservoirs to produce the diverter with the projected optimal particle size distribution; and
   applying the diverter with the projected optimal particle size distribution to the wellbore in real time.

4. The system of claim 1 wherein determining that near wellbore bridging or far field bridging has taken place further comprises:
   determining the time delay of pressure response or displacement volume from the onset of DPR waveform; and
   comparing the time delay of pressure response or displacement volume to a bridging threshold.

5. The system of claim 1 wherein the operations further comprise:
   determining a diversion index using the onset of DPR waveform and at least one of a machine-learning model or a total uniformity index;
   comparing the diversion index to a target value indicative of a successful diversion; and
   outputting an indication of successful diversion based on comparing the diversion index to the target value.

6. The system of claim 5 wherein the machine-learning model is used for determining the diversion index.

7. The system of claim 1 wherein the operations further comprise, based on the indication that near wellbore bridging or far field bridging has taken place for a test stage, adjusting at least one of diverter addition rate, diverter landing rate, relaxation time, or fluid rheology.

8. A method comprising:
   measuring, by a processor, an onset of diversion pressure response (DPR) waveform using a pressure sensor during or after pumping diverter into a wellbore;
   determining, by the processor, that near wellbore bridging or far field bridging has taken place in a wellbore based on a time delay of pressure response or displacement volume determined from the onset of DPR waveform;
   outputting, by the processor, an indication that near wellbore bridging or far field bridging has taken place in the wellbore as a result of pumping the diverter into the wellbore; and
   determining, by the processor, a projected optimal particle size distribution for the diverter and for an objective of near wellbore or far field diversion based at least on the indication that near wellbore bridging or far field bridging has taken place for a test stage.

9. The method of claim 8, wherein determining the projected optimal particle size distribution for the diverter and for the objective of near wellbore or far field diversion is further based on at least a fracture width.

10. The method of claim 9 comprising:
accessing a plurality of diverter reservoirs to produce the diverter with the projected optimal particle size distribution; and
applying the diverter with the projected optimal particle size distribution to the wellbore in real time.

11. The method of claim 8 wherein determining that near wellbore bridging or far field bridging has taken place further comprises:
determining the time delay of pressure response or displacement volume from the onset of DPR waveform; and
comparing the time delay of pressure response or displacement volume to a bridging threshold.

12. The method of claim 8 further comprising:
determining a diversion index using the onset of DPR waveform and at least one of a machine-learning model or a total uniformity index;
comparing the diversion index to a target value indicative of a successful diversion; and
outputting an indication of successful diversion based on comparing the diversion index to the target value.

13. The method of claim 12 wherein the machine-learning model is used for determining the diversion index.

14. The method of claim 8 further comprising, based on the indication that near wellbore bridging or far field bridging has taken place for a test stage, adjusting at least one of diverter addition rate, diverter landing rate, relaxation time, or fluid rheology.

15. A non-transitory computer-readable medium that includes instructions that are executable by a processor for causing the processor to perform operations related to applying diverter to a hydrocarbon well, the operations comprising:
measuring an onset of diversion pressure response (DPR) waveform using a pressure sensor during or after pumping diverter into a wellbore;
determining that near wellbore bridging or far field bridging has taken place in a wellbore based on a time delay of pressure response or displacement volume determined from the onset of DPR waveform;
outputting an indication that near wellbore bridging or far field bridging has taken place in the wellbore as a result of pumping the diverter into the wellbore; and
determining a projected optimal particle size distribution for the diverter and for an objective of near wellbore or far field diversion based at least on the indication that near wellbore bridging or far field bridging has taken place for a test stage.

16. The non-transitory computer-readable medium of claim 15 wherein the operation of determining the projected optimal particle size distribution for the diverter and for the objective of near wellbore or far field diversion is further based on at least a fracture width.

17. The non-transitory computer-readable medium of claim 16 wherein the operations further comprise:
accessing a plurality of diverter reservoirs to produce the diverter with the projected optimal particle size distribution; and
applying the diverter with the projected optimal particle size distribution to the wellbore in real time.

18. The non-transitory computer-readable medium of claim 15 wherein determining that near wellbore bridging or far field bridging has taken place further comprises:
determining the time delay of pressure response or displacement volume from the onset of DPR waveform; and
comparing the time delay of pressure response or displacement volume to a bridging threshold.

19. The non-transitory computer-readable medium of claim 15 wherein the operations further comprise:
determining a diversion index using the onset of DPR waveform and at least one of a machine-learning model or a total uniformity index;
comparing the diversion index to a target value indicative of a successful diversion; and
outputting an indication of successful diversion based on comparing the diversion index to the target value.

20. The non-transitory computer-readable medium of claim 15 wherein the operations further comprise, based on the indication that near wellbore bridging or far field bridging has taken place for a test stage, adjusting at least one of diverter addition rate, diverter landing rate, relaxation time, or fluid rheology.

* * * * *